Oct. 27, 1970           G. C. DEVOL           3,535,952

CONTROLLED TOGGLE MECHANISMS

Filed Aug. 26, 1968                         5 Sheets-Sheet 2

United States Patent Office 3,535,952
Patented Oct. 27, 1970

3,535,952
CONTROLLED TOGGLE MECHANISMS
George C. Devol, 990 Ridgefield Road,
Wilton, Conn. 06897
Filed Aug. 26, 1968, Ser. No. 755,210
Int. Cl. B61g 31/02
U.S. Cl. 74—520       28 Claims

ABSTRACT OF THE DISCLOSURE

A mechanism for operating a work element from one selected position to other selected positions in succession is described, utilizing the special property of toggles so that the end position is reached with smooth deceleration and without overtravel. Multiple toggles are used in a few embodiments, where each toggle has an input end that is adjustable while that toggle is buckled to correspond to the desired position that the work element will reach when a power actuator erects the toggle. One toggle is used for driving the work element in one direction and another toggle is used when the work element is to be driven in the opposite direction. Four toggles allow for drive in either direction by one toggle while another toggle is available for adjustment in controlling the next motion in either direction. This saves time, enabling each stroke to follow another without delay for adjustments. The selectively used toggles can be compactly arranged side-by-side at the same side of a work shaft but connected to opposite sides of the shaft, to rotate the shaft in either required operating direction. Similarly, a common adjusting unit can be used for all the toggles, utilizing extensible and contractable couplings between the adjusting unit and the adjustable toggle ends.

---

The present invention relates to apparatus capable of executing power strokes to various accurately controlled positions, especially under program control, but also by control from a remote point, and under manual control. The invention is more specifically related to apparatus having plural adjustable power actuators to carry out motions to a sequence of positions, where each motion has components in plural degrees of freedom. The apparatus described by way of illustration is an article-transfer machine, but the invention is broadly useful in other applications as, for example, X–Y tables.

A broad object of the invention resides in providing a toggle-type power actuating apparatus for operating a load to a succession of positions, including successive strokes in the same direction or in reverse directions as may be required.

A toggle is an ideal type of mechanical linkage for producing a rapid stroke with considerable power, having the prominent characteristic that the working end of the toggle decelerates smoothly as the toggle approaches its erect or straight state. Consequently, the load moved by the toggle decelerates smoothly as it reaches the end-point of each motion.

A more particular object of the invention resides in providing a dual-toggle actuator whose motions are adjustably controlled to carry a load or object through successive strokes of adjustable length, or to varied end-points, or from any starting position to any end position of the range of the toggles, all power strokes ending accurately with the toggle erect.

In achieving the foregoing objects, paired toggles are connected to a load, arranged to execute their erecting, powerstrokes in opposite directions. Depending on the desired direction of motion of the load from any given position to the next, one or the other toggle of the pair is to execute an erecting stroke. The input end of at least that toggle is adjustably set in a preliminary operation. The knee of the toggle is then driven by a power actuator to erect the toggle, driving the load to an end position determined by the adjusted setting of the input end of the toggle.

An elemental example of a controlled-stroke toggle actuator is disclosed in my Pat. No. 3,279,624 (FIG. 2) granted Oct. 18, 1966, but in that construction the toggle operates its load in only one direction and a power clamp produces the return motions without realizing the benefit of the toggle operating characteristics.

A further object of the invention is to provide for minimizing the time lost in adjusting the input end of the toggle or toggles to a succession of control positions. A pair of toggles are used for operations in opposite directions, each having an input end that is to be adjusted. A common adjustment means is used for adjusting the input ends of both of the toggles. In one embodiment of the invention that has only one pair of toggles, the adjustment means operates during the time that either toggle is executing a power stroke and has its input end locked in a previous adjustment. Completion of the setting operation occurs between each toggle stroke and the next. In a further embodiment of the invention, the apparatus is equipped with two pairs of toggles, and there is a common means of adjustment for the input ends of all the toggles. One toggle of each pair executes a forward power stroke and the other toggle of that pair execute a reverse power stroke of the apparatus. The forward-acting toggle of one pair is available to be adjusted and ready for executing an ensuing forward stroke during the time that the forward-acting toggle of the other pair is executing an operating power stroke of the apparatus. By like token, the input end of the reverse-acting toggle of one pair is adjusted while the other reverse-acting toggle is in a power-stroke operation. The adjustment of a toggle that is to execute the next power stroke is completed during a present power stroke of the apparatus, regardless of whether the two strokes are in the same or opposite directions.

A still further aspect of the invention resides in the provision of means for utilizing a single adjustment means for setting the input ends of each of the toggles. Usually, a coupling device is provided between the adjustment means and each of the input ends of the toggles to accommodate the locked setting of the input end of the toggle that is executing a power stroke during the adjusting operation. Where one pair of oppositely acting toggles is used, the coupling device quickly adjusts the input end of the toggle that is to operate next so as to conform to the setting of the adjustment means. Where two pairs of toggles are used, the coupling devices are effective in setting one toggle into its adjusted condition conforming to the common adjustment means while another toggle is carrying out its power stroke and its input end is locked in a previously adjusted setting.

Further objects and novel features are pointed out in the following detailed description of a few embodiments of the various aspects of the invention, and from this description the foregoing objects and features will be more fully understood and appreciated. The accompanying drawings form part of the disclosure of the described embodiments.

Figure 1:
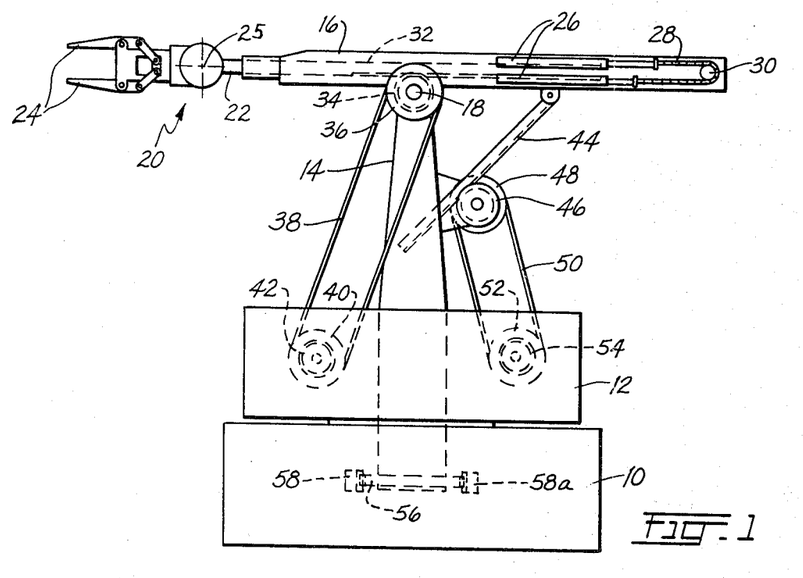
FIG. 1 is an elevation of an article handling machine embodying features of the invention.

An article handling machine is shown in FIG. 1, having a fixed base 10, a secondary base 12 and a post 14 supported by base 10 for rotation as a unit about a vertical axis, and a boom or arm 16 movable in a vertical arc about pivot 18. Head 20 of the machine is supported by a rod 22 for in-and-out motion relative to arm 16, a motion that is radial in relation to the vertical axis of post 14. These three motions in as many degrees of freedom— rotation about the vertical axis, arcuate about pivot 18 and radial—represent the three heaviest work loads of the machine, more fully discussed below.

Head 20 carries article-gripping jaws 24 and contains gearing (not shown) for effecting a pivotal motion or "wrist-bend" about horizontal axis 25 perpendicular to the view and for effecting a twist motion about an axis midway between jaws 24, parallel to the view. A suitable actuator in head 20 such as a hydraulic piston (not shown) operates jaws 24 to grip and release an article. The internal details of head 20 are shown and described in detail in my Pat. No. 3,306,471, granted Feb. 28, 1967.

A pair of hydraulic cylinders 26 operating a chain 28 about a sprocket 30 operates the wrist-bend gearing in head 20, and another such mechanism operates the twist mechanism in head 20. Both operating mechanisms operate through splined shafts from head 20 to arm 16. Other details are fully described in my Pat. No. 3,306,471. These motions require comparatively modest operating effort. Insofar as speed, acceleration and deceleration are concerned, the load to be operated is moderate. The moment of force exerted by head 20 is limited, as is the article weight to be carried. The twist and wrist motions involve relatively slight moments since they take place about axes located relatively close to the center of head 20 or of the article in jaws 24.

Head 20 is moved radially by a rack 32 and gear 34, a sprocket 36 fixed to gear 34, a chain 38, and another sprocket 40 fixed to main drive gear 42. Head 20 is moved in a vertical arc about pivot 18 by a rack 44 that is in mesh with gear 46. Rack 44 is pivotally connected to arm 16. Sprocket 48 is fixed to gear 46 and is driven by chain 50 that also extends about drive sprocket 52. Main drive gear 54 is fixed to sprocket 52. Secondary base 12 and the post 14 and arm 16 carried thereby are operated about their vertical axis by main drive gear 56. In FIG. 1, the main drive gear 56 is shown in mesh with two racks 58 and 58a forming part of the operating apparatus described below.

In contrast to the relatively light loads involved in the twist and wrist motions, head 20 is moved radially through a long stroke in a limited time interval, and represents a substantial work load to be moved and arrested by the related operating mechanism. Arm 16 also represents a large work load that is to be accelerated and decelerated arcuately about pivot 18 by the arm-actuating apparatus. Finally, a large torque, acceleration and deceleration must be developed by the mechanism that rotates secondary base 12 and post 14 about a vertical axis. This drive effort must also swing arm 16, head 20 and the article in jaws 24, about the vertical axis of post 14.

Figure 2:
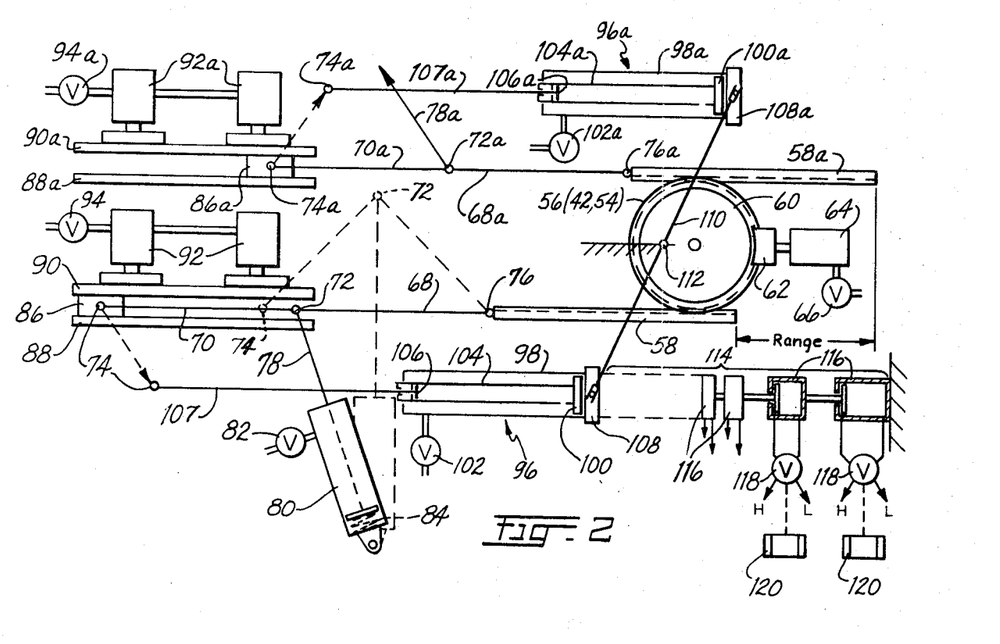
FIG. 2 is a diagrammatic lateral elevation of a presently preferred operating mechanism for each of three parts of the apparatus in FIG. 1, embodying further features of the invention.

FIG. 2 illustrates a highly effective and relatively simple form of power actuator for effecting controlled operations of each of the main drive gears 42, 54 and 56 in FIG. 1. In the discussion that follows, only gear 56 is mentioned, but the other two gears are operable by duplicate mechanisms contained in the secondary base 12. The mechanism for operating gear 56 is contained in base 10. Gear 56 is FIG. 2 has fixed bearings. Secured to gear 56 is a brake drum 60 that may be locked by a brake shoe 62. A piston-and-cylinder actuator 64 having a control valve 66 and a compressed air or hydraulic fluid supply line is used to operate the brake.

Racks 58 and 58a are in mesh with gear 56 and are slidable in suitable bearings. A toggle consisting of links 68 and 70 are pivoted together at a knee 72. Input end 74 and output end 76 of the toggle are guided in suitable slide bearings aligned with rack 58. Knee 72 has a piston rod 78 connected to it, for operation by fluid pressure admitted to cylinder 80 under control of valve 82. The lower end of the cylinder is pivoted so that the actuator 78, 80 can follow the knee of its toggle throughout the range of operating positions. The pressure drives the toggle from a buckled condition to an erect condition, but not beyond the erect condition due to suitable limiting means in the knee of the toggle or an elongated stop in line with the toggle ends. A small compression spring 84 in cylinder 80 provides bias that urges knee 72 of the toggle out of line with the ends of the toggle (when there is no pressure in cylinder 80) so that lengthwise pressure at the input end of the toggle will buckle the toggle.

Input end 74 of the toggle is adjustable, and can be locked at any place within its maximum range. For this purpose, a block 86 is provided in which input end 74 of the toggle is pivoted. Block 86 is suitably guided between a fixed brake shoe 88 and another brake shoe 90. Fluid-pressure actuators 92 are operated by pressure admitted via control valve 94 to lock block 86 and input end 74 of the toggle in any adjusted position.

A coupling device 9 is slidable alongside the toggle links 68 and 70 and alongside rack 58, but for clarity coupling device 96 is shown in FIG. 2 below its actual position. the coupling device includes an outer fluid-pressure cylinder 98, a piston 100 and a fluid-pressure inlet valve 102. Piston rod 104 is hollow and contains a piston 106 that is connected by rod 107 to adjustable input end 74 of the toggle. Tubular rod 104 has an opening adjacent piston 100 to admit and discharge fluid from or to cylinder 98. Of particular significance is this: When pressure is admitted to cylinder 98, and when rod 108 is not restricted, piston 100 moves to its right-hand extreme position and piston 106 moves to its left-hand extreme position. In this configuration coupling device 96 is in its mean-length condition. The end of device 96 connected to input end 74 of the toggle can move toward cylinder 98 for a distance at least as great as the maximum stroke of rack 58, thus shortening device 96. Piston 106 can pull piston 100 leftward in cylinder 98 for a distance at least as great as the maximum stroke of rack 58. In the position of the parts of device 96 shown, the length of device 96 is a mean, and is limited by pistons 100 and 106 reaching their right-hand and left-hand limits, respectively. This condition is established by pressure in cylinders 98 and 104. In concept, this could be a sustained pressure, or it could even be supplied by springs in those cylinders, essentially as shown in FIG. 4 of my Pat. No. 3,279,624.

Rack 58a is operable by a duplicate of the described toggle mechanism, including toggle links 68a, 70a, a fluid-presure actuator having a piston rod 78a operable in a power stroke to erect the toggle, and having an input end of the toggle 74a in block 86a adjustable along brake shoes 88a and 90a. Block 86a can be arrested in any adjusted position by actuator 92a of the fluid-pressure brake or lock and its control valve 94a. Finally, a coupling device 96a is shown above the toggle and the rack for clarity. Device 96a is shown in its mean-length condition, with pistons 100a and 106a in their extreme right-hand and lefthand positions in their cylinders, respectively.

Fixed to each cylinder 98, 98a remote from the input end 74, 74a of its respective toggle is a block 108, 108a that is slidably guided parallel to racks 58, 58a. These are connected by an equal-arm lever 110 for reverse operations. Block 108 is shown in its exterme left-hand position and block 108a is shown in its extreme right-hand position. Lever 110 has a fixed pivot 112 at its center. The extremities of lever 110 have suitable slide bearings in blocks 108, 108a accommodating the arcuate motion of the lever ends to the linear motion of the blocks.

Means is provided for enforcing motion of block 108 to the right and to the left to exactly controlled positions. A suitable adjusting device 114 for this purpose is a column of double-acting fluid-pressure actuators 116 each having a control valve 118 to admit fluid under pressure selectively to the right or the left end of its cylinder for driving its piston to the opposite exterme position. The valve vents the opposite end of the cylinder or, in the case of hydraulic fluid, the valve releases the fluid to the low-pressure part of the system. The stroke of each piston in its cylinder is a precisely established dimension. To advantage, one fluid-pressure actuator 116 has half the maximum stroke required of racks 58, 58a, another has half that stroke, and so on in progression to the smallest desired increment of motion of the racks. Each piston acts on the cylinder of the next actuator in this column. Together the actuators can drive blocks 108 and 108a to their opposite extermes by pulling or pushing block 108.

Various combinations of cylinders can be actuated to the right and to the left, in this way driving block 108 to any desired position within an increment limit determined by that actuator 116 which has the smallest stroke. A binary-code program recording on punched tape or magnetic recording or any other control medium may be used to control solenoids 120 to actuates valves 118 selectively; and a manual control having a binary numerical-code pattern of perforations or contacts or the like can also be used to control solenoids 120. Controls of this type are shown in my Pats. Nos. 3,251,483, 3,279,462 and 3,283,918. My Pat. No. 3,729,624 also shows other forms of program controls as suitable substitutes for the illustrated adjustable means 114.

The operation of the apparatus in FIG. 2 is a follows. It may be assumed that all of the actuators 116 are extended, that valves 102 and 102a have pressurized coupling devices 96 and 96a, and that actuator 80 and its companion actuator for rod 78a have been caused by their control valves 82 to erect the upper and lower toggle 68, 70 and 68a, 70a. This condition places gear 56 (or 42 or 54, as may be the case) at the clockwise limit of its range. The next motion is to be a controlled counterclockwise rotation of gear 56. Before any change occurs among cylinders 116, gear 56 is locked in position by setting brake 60, 62. Pressure in actuator 80 is released, and valve 102a vents coupling device 96a. Spring 84 biases toggle 68, 70 toward its buckled state, and this toggle becomes buckled (see the broken lines) when cylinders 116 in any selected combination retract their pistons so as to pull block 108 to the right. Piston 106a of coupling device 96a is stationary. When block 108 moves to the right, block 108a moves to the left and cylinder 104a moves to the left along rod 107a of piston 106a.

The new adjustment of the control portion of the apparatus is now complete. In this instance, assembly 114 has acted via block 108 and pressurized coupling device 96 to shift the input end 74 of toggle 68, 70 toward the right. Unit 114 preferably sets before coupler 96 works. Valve 94 is next operated to cause actuators 92 to clamp or lock the block 86 in place, fixing the adjustment of the input end of the toggle.

Valve 82 is next used to cause actuator 80 to pull its rod 78 in a power stroke to erect toggle 68, 70 and at the same time or a moment earlier, brake 60, 62 is released. Rack 58 is driven to the right, rotating gear 56 counterclockwise in a powered motion to the extent determined by the adjustment of the input end of the toggle. During this motion, valve 94a releases block 86a, and as one mode of operation, toggle 68a, 70a may remain erect. Rack 58a shifts to the left when gear 56 executes its powered motion under control of toggle 68, 70. Toggle 68a, 70a shifts to the left, and draws piston 106a back to its illustrated relationship to its cylinder 104a. Brake 60, 62 is then set by its actuator 64, and locks 90 and 90a at the input ends of the toggles are released. The apparatus is now ready for the next stroke. If further counterclockwise rotation of gear 56 is wanted, the same operations as described are repeated.

Let it now be considered that the gear 56 in FIG. 2 is not at its extreme clockwise limit of its range, and that the next operation is to be clockwise rotation of gear 56. The appropriate combination of actuators 116 is operated to move block 108 to the left, to the exact extent desired. Parts 98a and 108a shift to the right. Coupling device 96a is pressurized at this time, to bias its parts to assume their mean positions as shown. Toggle 68a, 70a collapses to the extent required to accommodate the adjustment of its input end 74a to its fixed output end. During this motion, while gear 56 is locked, piston 106 is fixed in position by its erect toggle 68, 70 and rack 58, all of which is arrested while gear 56 is locked. Apart from piston 106, the rest of unit 96 shifts leftward with block 108 in this operation. A sequence of operations is then carried out as in the case of the lower toggle for causing the upper toggle to execute its power stroke.

A manual combination-code controller for actuators 116 or a program controller is changed from one position-selecting setting to another. After blocks 108 and 108a are set, the side of the apparatus that is not to execute a power stroke is conditioned opposite to that for the side that does execute a power stroke. Either the brake 90 or 90a or the actuator of rod 78 or 78a or both are released on the side of the apparatus that is not to execute a power stroke. This is taken into account by providing a direction-of-motion control for the control valves of the upper or the lower toggle, in addition to the combination-code control that determines the next position. This direction-of-motion control is included with the manual control and as part of a control program.

A further feature is achieved in the apparatus of FIG. 2, for speeding the sequence of operations. As soon as one brake 90 or 90a is locked, it is possible immediately to continue with another setting of the adjustment assembly 114. Thus, suppose block 86 were newly adjusted in position by pressurizing coupling device 96 so that input end 74 of the lower toggle agrees with the setting of block 108, and suppose that block 86 is then locked in place to control the ensuing power stroke of the toggle 68, 70. A new rightward adjustment for block 108 can immediately be started by contracting the assembly of actuators 116 to the required extent. This is made possible by the provision of cylinder 98 and piston 100 in the cylinder of coupling device 96. As block 108 is drawn to the right while block 86 is locked in place, piston 100 remains at rest while its cylinder 98 is drawn to the right. The provisions of piston 106 and cylinder 104 in coupling device 96 similarly accommodates leftward shift of block 108. A new setting for block 108 is thus established during the same period that is allowed for either toggle to perform its power stroke. Immediately afterward, brake 60, 62 is set momentarily and locks gear 56 in place. Block 86 or 86a is then released, to be driven to the next setting by pressurized coupling device 96.

It would be feasible to omit coupling devices 96 and 96a in the foregoing apparatus. Actuators 116 would be selectively pressurized to establish each new setting of block 86 or 86a. However assembly 114 in that case is not positive-acting and would assume its intended length only when brake 62, 64 is locked and blocks 86, 86a are released.

Figure 3:
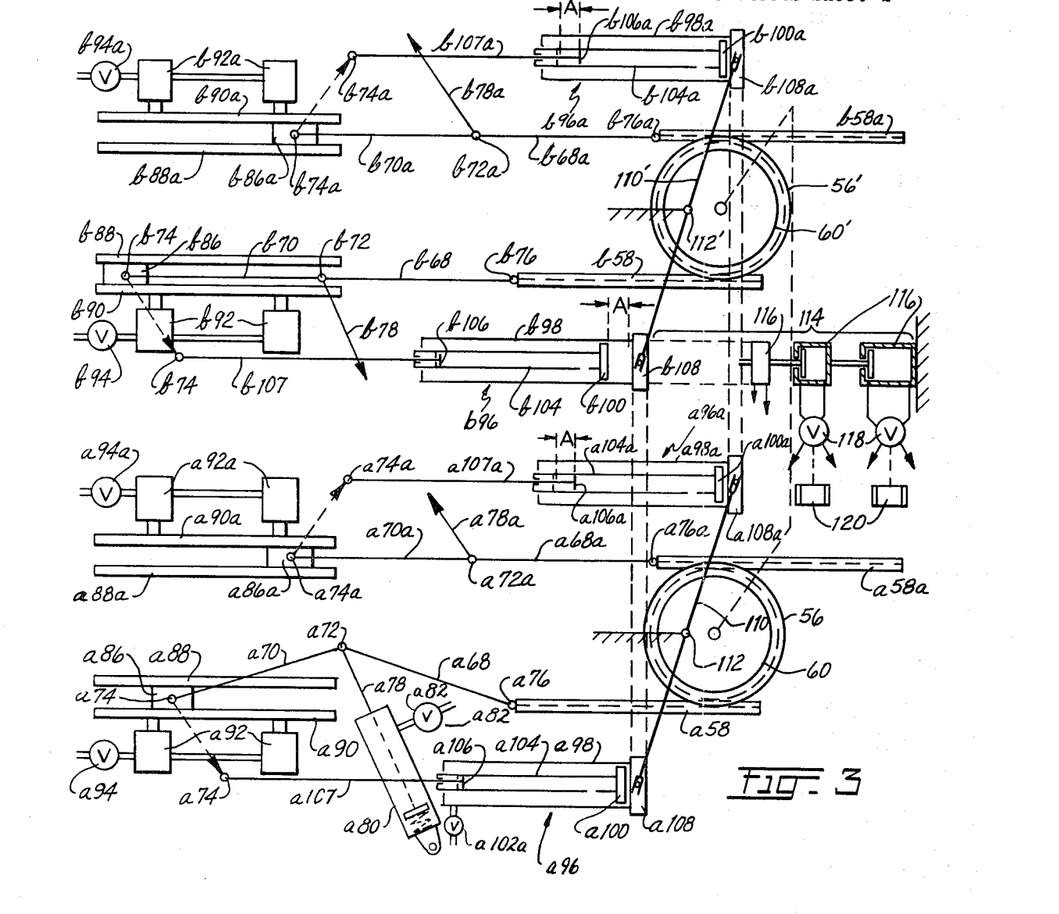
FIG. 3 is a diagrammatic lateral elevation of another presently preferred operating mechanism for each of three parts of the apparatus in FIG. 1, being a modification of the embodiment in FIG. 2.

A further saving in time is realized pursuant to the embodiment in FIG. 3. The parts corresponding to those in FIG. 2 are distinguished by a prefix a or b (except that the adjusting assembly 114 is the same) and carry the same numbers. Gear 56 and another gear 56' are both fixed to common shaft 56a which is the output shaft of the whole apparatus.

Brake 60, 62 of FIG. 2 has been omitted in FIG. 3. Two pairs of toggles are used for operating gear 56–56', together with two coupling devices for each pair of toggles and two pairs of brakes for locking the input ends of the two pairs of toggles, respectively. Blocks a108 and b208 are united and are driven to the right and left by unit 114.

In FIG. 3, toggle a68–a70 is shown partially collapsed, with its coupling device pressurized and its adjustable input end a74 set in accordance with the control code that established the length of the adjusting assembly 114. At this time at least one of the brake elements a90a, b90, and b90a is operative to hold the input end of its related toggle locked, and that related toggle is being operated by its pressurized power actuator (not shown) connected by actuator rod a78a, b78 or b78a to the knee of its toggle. Under this condition the operation and end positions of gear 56–56' are fully under control of that toggle. Meantime, the extent that toggle a68, a70 is being collapsed and having its input end set, is determined by the adjusting means 114 and the coupling device a96. The other coupling devices a96a, b96 and b96a are not pressurized, and in each instance one of the pistons is displaced relative to its cylinder by a distance A which equals the displacement of input end a74 of the lowermost toggle in the drawing from the position it occupied just previously when its toggle was straight.

Following the adjustment of input end a74 of toggle a68, a70, its block a86 is located by brake element a90. It is then in condition to control the extent of counterclockwise drive of gear 56–56'. The power actuator a80 of rod a78 is pressurized, and at that time or earlier, blocks a86a, b86 and b86a are all released and in condition to accommodate the adjustment of any other input end a74a, b74 or b74a by adjusting assembly 114, etc. Two successive steps of motion can be executed in quick succession, whether in the same or opposite directions. During each power stroke of the output end a76, a76a, b76 or b76a of one of the toggles, the adjusting means 114 and the input end of another of the toggles are adjusted to be ready for the next stroke. It will be understood that the program control means of the apparatus (or the manual controls if the machine is under manual control) includes provision for controlling the various brake actuators 92, the various power actuators for the toggle knees, and for pressurizing coupling devices 96 selectively, so as to select the toggle that is in effect at any one time and the toggle that is being set at that time to produce the next operating stroke.

Figure 3A:
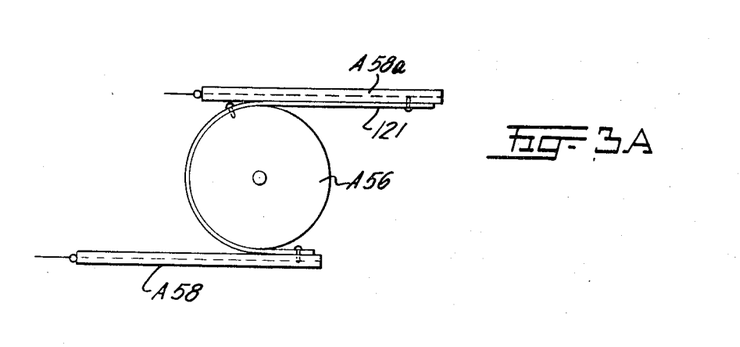
FIG. 3A is a modification of a detail of FIGS. 2 and 3.

The rack-and-gear couplings between the toggles and the shaft rotated by gear 56 may be made accurately for minimum play or error between forward and reverse operations, or anti-backlash gearing may be used; or (FIG. 3A) a flexible but inextensible band 121 may be secured to bars A58 and A58a (in lieu of racks a58 and a58a in FIG. 3) at a point remote from the output end of the related toggle, and arranged to extend along the bar and around drum A56 (in lieu of gear 56) to a secured point on the drum.

Figure 4:
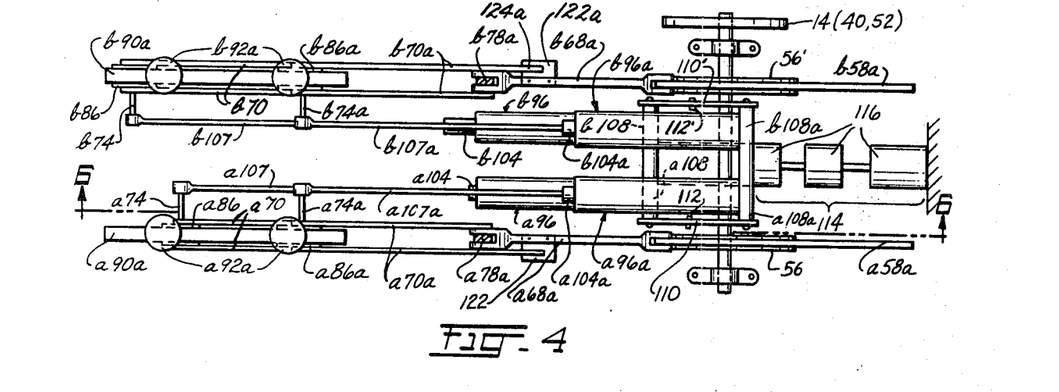
FIG. 4 is a plan view of the operating mechanism of FIG. 3, including structural details.
Figure 5:
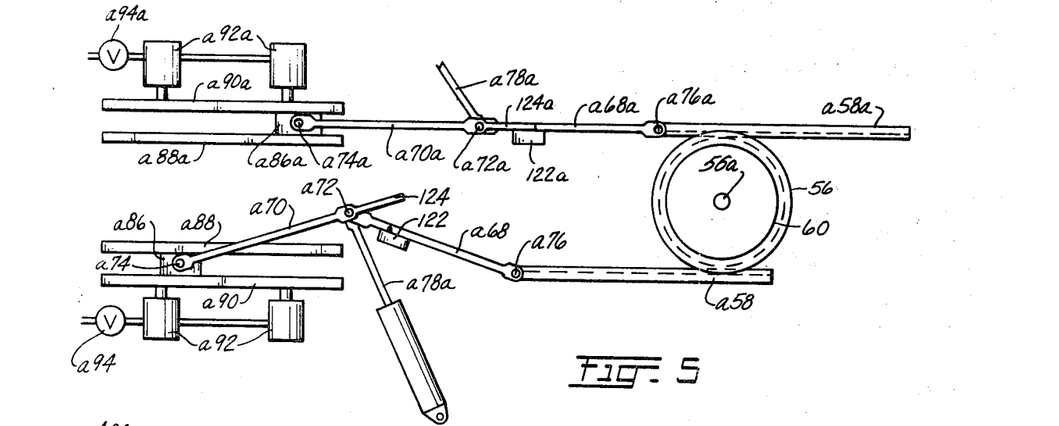
FIG. 5 is a front elevation of the mechanism in FIG. 4.
Figure 6:
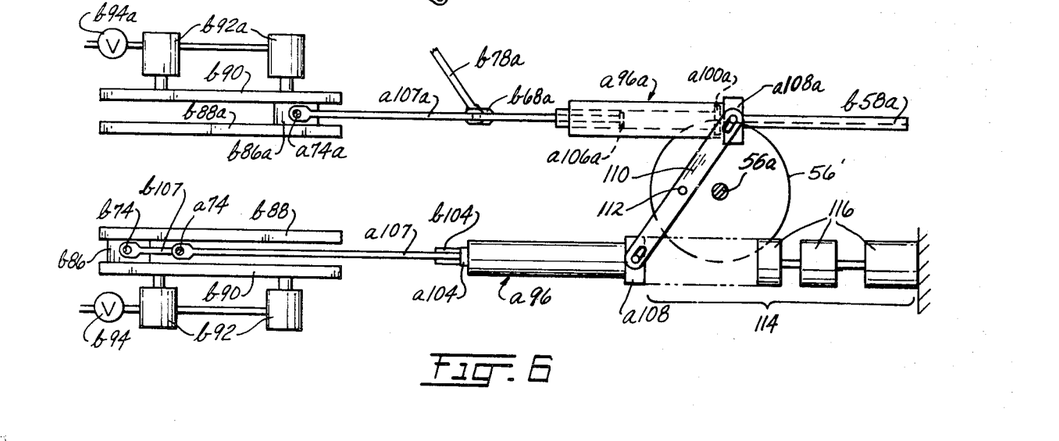
FIG. 6 is a vertical cross-section of the mechanism in FIG. 4 viewed from the plane 6—6 in FIG. 4.

The physical arrangement of the active parts in FIG. 3 are shown in FIGS. 4, 5 and 6. These figures will also serve to illustrate the physical arrangement of like parts of FIG. 2. In FIG. 4, the shaft 56a that couples gears 56 and 56' is illustrated as being connected to a disc representing post 14 or either of the sprockets 40 or 52, depending on where the apparatus in FIGS. 3–6 is used in FIG. 1. Where multiple mechanisms of this form are used to execute coordinated motions in multiple degrees of freedom, it may be found advantageous to use some form of interlock among the toggles used in each of the coordinated strokes. For example, series-connected switches can be mounted at the respective knees of the toggles that close when the toggles are erected and have therefore completed their strokes. One switch 122 is mounted on link a68, to be closed by extension 124 of link a70. As discussed below, such switches should be connected in control relation to the sequencing operations of the various solenoid valves (such as valves 66, 82, 82a, 94, 94a, 102, 102a and the like) for delaying subsequent strokes until the concurrent power strokes in all the degrees of freedom have been completed.

The description of the parts in FIGS. 4–6 and their connection is not given here since it would amount to a repetition of the description already given in connection with FIGS. 2 and 3.

Figure 7:
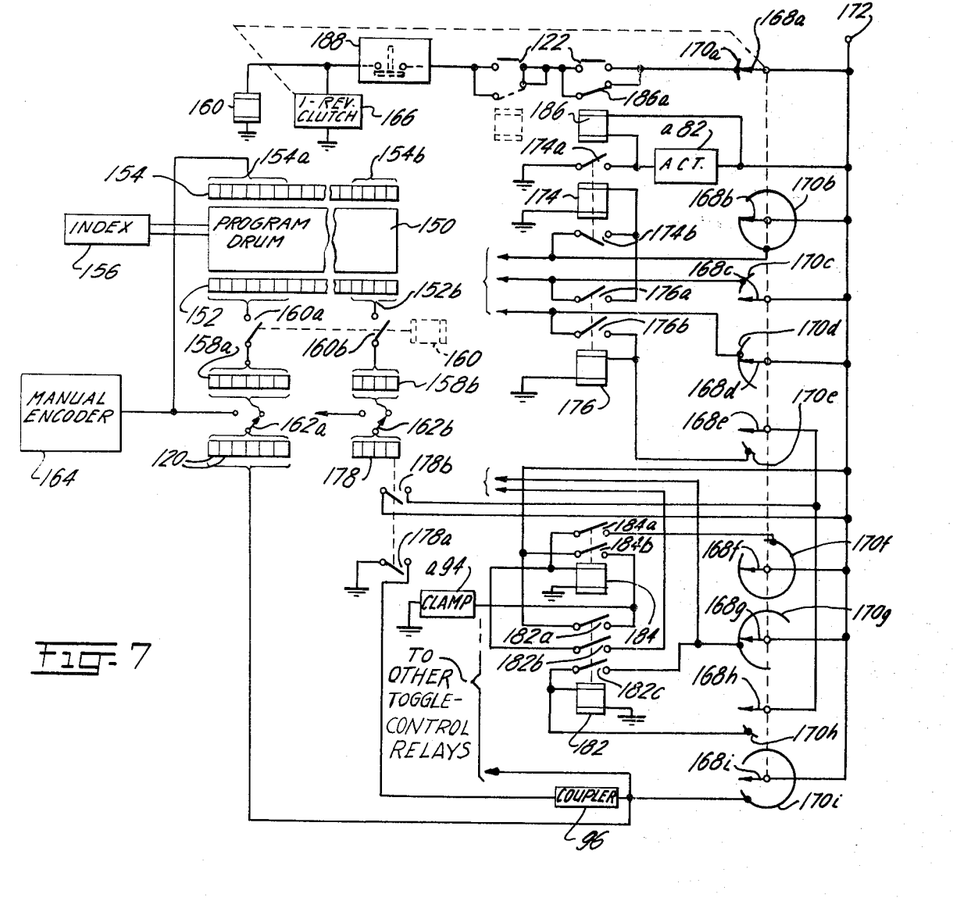
FIG. 7 is a wiring diagram of control apparatus for the embodiment of FIG. 3.

FIG. 7 is a wiring diagram of suitable control and coordinating means for the embodiment in FIGS. 3–6, partially in block-diagram form. This control apparatus demonstrates a manner of carrying out automatically a sequence of prescribed operations, and of establishing the the desired control program initially.

In FIG. 7, a magnetic program drum 150 is shown equipped with a row of magnetic sensing heads 152 and 154. The drum has a surface layer of magnetically retentive material. An indexeding mechanism 156 is provided for advancing the drum stepwise, so as to dispose successive discrete areas opposite the sensing heads. A series of discrete areas simultaneously in sensing position is called a "slot"; and the circular series of discrete areas that are sensed successively by any one sensing head is called a "track." The sensing heads in this particular example of control apparatus is the well-known "at rest" sensing type. The recording heads are shown as separate units for convenience in illustration, but commonly both the sensing and recording functions are performed by a common "read-write" head, conveniently including separate read and write windings. In lieu of the indexed type of drum, it is evident that drums having a sensing gate circuit could be substituted, and other control media may also be substituted.

Heads 152 and 154 are divided into groups, including separate groups 152ea and 154a for the operating mechanism (FIGS. 3–6) that is used in each degree of freedom in the apparatus of FIG. 1. Additionally, there are sensing and recording heads 152b and 154b for controlling the coordination of the operating mechanisms and for coordinating the functions of the apparatus of FIG. 1, with external apparatus, generally in the manner set forth in my Pat. 3,251,483.

Temporary storage registers 158a and 158b are provided for each group of sensing heads 152a and for group sensing heads 158b, coupled thereto by suitable transfer switching means 160a, 160b. This switching means is shown as being part of a relay 160, although in practice solid-state switching may well be used. The storage register 158a includes as many sections as there are solenoids 120 for control valves 116 in FIG. 3. Selector switching means 162a is included for connecting solenoids 120 either to the storage register 158a as shown, or to a manually operable digital encoder 164. The code used is preferably of the type in which only one bit of the code changes in advancing from any given position to the next adjacent position requiring a code change.

Switching means 162b is also included, for connecting function-control and coordinating relays 178 either to storage register 158b or to manual controls, for purposes discussed more fully below.

When a program is to be established initially, switching means 162a is arranged to connect encoder 164 to solenoids 120. By reversing switch 162b from the position shown, and by using manual controls for the various valves in the apparatus, the work head 20 (FIG. 1) is adjusted to a desired position. Thus, assembly 114 is progressively adjusted to the length required to locate head 20 at the desired position. During this operation, the related coupling device $a96$ (for example) is kept pressurized, and pressure is supplied to actuator $a80$ for keeping it erect. In this slow operation, it is assumed that pistons 116 can supply the requisite effort. Otherwise a process of trial-and-error adjustment of assembly 114 and clamp $a94$, then actuator $a80$, could be used. When the desired adjustment is reached, the code of unit 164 is entered on drum 150 by the related group of recording heads 154a. This is done in the case of each of the other groups of recording heads 154a for associated mechanisms included in FIG. 1; and in the same "slot" of the drum, "write" heads 154b are selectively energized by manual means (not shown) to enter the related coordinating control indicia, in accordance with each of the toggle mechanisms that were used at each positioning step. This $b$ recording is effective, later, to select which of the four toggles is to be adjusted and then to be actuated, at any given time.

For automatic program-controlled operation, switching means 162a 162b is set to the position shown in FIG. 7.

The automatic operation is controlled by a cycle timer having a continuously rotating motor, a one-revolution clutch 166 and a shaft that operates wiping contact arms 168a, 168b . . . 168i that cooperate with stationary contact sectors 170a, 170b . . . 170i, respectively. In the drawing, it is assumed that arms 168a, etc. rotate clockwise; and contact sectors 170a, etc., are illustrated approximately in accordance with a suitable timing relationship, at the start of a timing cycle.

The following control circuit is provided for controlling actuator $a80$ by means of its solenoid-operated control valve $a82$. The other three toggles have like control circuits, selected by sensing heads 152b and, optionally, using the same timer contacts where feasible. In this circuit, line 172 is one side of an energizing supply, and the opposite line of the supply is represented as ground. Solenoid valve $a82$ is connected in series with control contacts 174a of relay 174. Relay 176 has control contacts 176a connected in a series energizing circuit for relay 174. This circuit extends from line 172, to contact arm 168c, contact sector 170c, and contacts 176a, to relay 174 and ground. When relay 174 is energized, its holding contacts 174b close. This completes an energizing circuit to line 172 including control arm 168b and contact sector 170b. The latter has a gap of about 20° at the start of the rotation of arm 168b. After a minimal angle of rotation from its starting position shown, arm 168c energizes relay 174 (provided contacts 176a are closed) and valve $a82$ operates actuator $a80$ to erect toggle $a68$, $a70$. The pressure in the actuator is sustained until the cycle timer starts its next rotation. The cycle timer stops after completing one rotation, to await another operation of one-revolution clutch 166. Rotation of arms 168b and 168c do not cause operation of actuator valve $a82$ if relay 176 is not energized during the time arms 168b and 168c sweep over contact sections 170b and 170c. Moreover, if relay 176 is energized at the start of a timer rotation and if relay 176 is deenergized during that rotation, relay 174 is deenergized promptly at the start of the ensuing rotation of the timer.

Relay 176 is energized as follows. Relay contacts 178b operated by relay 178 (or solid-state switching means) are selected and controlled by temporary storage 158b and the recording in a related track on drum 150. Closing of relay contacts 178b energizes contact arms 168e and 168h. Contact arm 168e reaches contact sector 170e after about 300° from its start of rotation, so that relay 176 is energized at that time if there is a control recording that causes contacts 178 to close. Relay holding contacts 176b close to complete a relay holding circuit through contact sector 170d and contact arm 168d to line 172.

Accordingly, in case a recording is sensed in one "slot" of drum 150 calling for operation of the valve $a82$ of toggle actuator $a80$, relay 176 is energized during one rotation under the control of temporary storage register 158b, holding into the ensuing rotation of cycle timer 168a . . . 168i. Valve $a82$ is not operated during that first rotation. Relay 176 remains energized at the start of the ensuing rotation. Closing of contacts 168c, 170c at the start of that ensuing rotation energizes relay 174. Relay holding contacts 174b close to hold relay 174 energized via contacts 170b and 168b during the remainder of that ensuing rotation of the cycle timer. Thus, when a recording is sensed and part of register 158b is set for an operation of valve $a82$ of toggle actuator $a80$, a full rotation of the cycle timer follows without operation of the valve. It is during this first cycle that the input end of the related toggle is adjusted and secured in place. During virtually the whole next rotation, the valve $a82$ is operated, for effecting a toggle-erecting power stroke of the adjusted toggle.

Relay 160 is connected in parallel with the control of one-revolution clutch 166. At the start of each rotation of the cycle timer (and the end of the previous rotation) relay 160 is energized, to effect transfer of the sensed code from heads 152a and 152b to temporary storage 158a and 158b. Soon after the start of the timer cycle, contact arm 170i completes the energizing circuit for solenoids 120. Those solenoids 120 which are selected by register 158a are then effective to operate solenoid valves 120 of cylinders 116. Coupling device 96 is energized selectively in dependence on closing of contacts 178a. This occurs at the same time as is allowed for valves 120 to effect adjustment of assembly 114, in the circuit shown. The pressure in couplers 96 is made high enough only to adjust block 86 at the input end of the related toggles, provided that the related clamping solenoid valve 94 releases its clamp 92. For this reason, couplers 96 may be pressurized during the time that assembly 114 is forcibly readjusted. As an improvement it may be preferable for this adjustment to be facilitated by delaying the operation of solenoid valve 102 of the selected coupling device 96 until some time after assembly 114 has been adjusted by its valves 120. An additional timer contact and an appropriate contact sector would be needed for separate, retarded pressurizing of the selected coupler 96.

Assembly 114 and pressurized coupling device $a96$ are thus operative to adjust block $a86$ at the input end of toggle $a68$, $a70$ (or any other toggle selected by a related relay 178). During this time it is important for the clamp solenoid valve $a94$ to be released, but to become set at the end of the time period provided for adjusting the input end of the toggle. The control circuit for the clamping valve-control solenoid is as follows.

Selective closing of contacts 178b energizes contact arm 168h, and toward the end of the cycle arm 168h reaches contact sector 170h for energizing relay 182. Immediately, control contacts 182a close and energize solenoid valve $a94$ to operate clamp $a92$ for locking the theretofore adjusted block $a86$ securely in place. Block $a86$ is retained in place after contact arm 168h leaves sector 170h, because relay holding contacts 182c close and complete a relay holding circuit via contact sector 170g and contact arm 168g to line 172. Relay contacts 182b also close. By the time contact arm 168f has rotated about one-quarter of a revolution into the second cycle of the timer, a circuit is completed from line 172 via arm 168f and contact sector 170f, through contacts 182a, to relay 184. Then relay contacts 184a close to provide a holding circuit that keeps relay 184 energized after contact arm 168g leaves contact sector 170g to deenergize relay 182. Contacts 184b also close, providing a second energizing circuit from line 172 to clamp solenoid valve $a94$, contacts 184b being in parallel with contacts 182a that are also closed at this time. Contacts 184b maintain the energization of clamp-control solenoid valve $a94$ even after contacts 182a open later, when arm 168g leaves contact sector 170g. Thus it appears that clamp solenoid valve $a94$ operates clamp $a90$ near the end of one cycle-timer rotation and maintains that energization through the end of that rotation and during the whole ensuing time rotation. The clamp-control solenoid valve can be held operative into the third time cycle if desired by virture of contact sector 170f. As soon as arm 168f reaches the gap in sector 170f, the energy to relay 184 via its holding contacts 184a is interrupted; and prior to that time, contact arm 168g parted from contact sector 170g so as to interrupt the holding circuit to relay 182. Release of relay 184 by the gap in contact sector 170f finally deenergizes solenoid valve a94 of the clamp for the input end of toggle a68, a70.

Figure 7A:
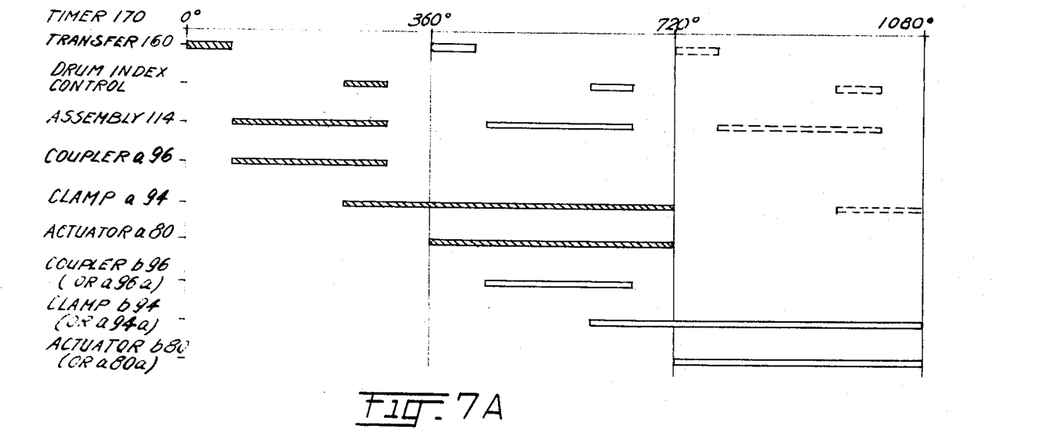
FIG. 7A is a timing diagram of a portion thereof.

During the first of the time cycles described above, the assembly 114 is being set by pistons 116 under control of solenoid valves 120. Near the end of this first timer cycle, the end of the selected toggle can be presumed adjusted, and the related clamp of the toggle input end is set. The clamp remains set throughout the second time cycle, and a little longer if desired. The related toggle-erecting actuator is activated to erect and maintain the toggle erect. This operates and holds operated the work output end of the multiple toggle mechanism. During this "second" timer cycle a "first" timer cycle is taking place for another selected toggle. This timing sequence is represented in FIG. 7A. The drum can be indexed at almost any time in the timer cycle.

The described operation of toggle a68, a70 results when switches 178a and 178b close under control of a sensed control recording in a slot on the drum. During the first 360° of timer rotation, presumably another previously adjusted and clamped toggle mechanism is executing a power stroke; and during the 360° to 720° interval when toggle actuator a80 is executing a power stroke, another input end of a toggle a86a, b86 or b86a is being set, having been selected under control of the drum and controlled by a section of storage register 186b When any one of the toggles is erect, it closes its contacts 122. See toggle a68a, a70a in FIG. 5; and see open switch 122 of toggle a68a, a70 in the same figure. Each of the toggle switches 122 of the apparatus, in each degree of freedom, is normally short-circuited or by-passed by associated relay contacts 186a which are normally closed. Relay 186 is connected in parallel with the valve actuator a82. Accordingly, whenever actuator valve a82 is energized, relay 186 is also energized; and since contacts 186a are then open, completion of the circuit from line 172 to the one-revolution clutch 166 of the cycle timer is dependent on closing of the related contacts 122. All the switches 122 of the apparatus are in series, each with its parallel relay contacts 186a. Consequently no new operating cycle is started until the last-previous cycle has been completed. Additionally, the ensuing program-controlled work cycle can be delayed to allow for operation of other equipment between work strokes of the described apparatus. A coordinated function control 188 can be interposed in the series circuit, controlled externally or by a section of register 158b.

It will readily appear that the foregoing control circuit which coordinates the mechanisms of FIG. 3 can be readily adapted to the simpler embodiment of FIG. 2. The overlap of the setting function of one toggle mechanism during the work stroke of another toggle mechanism in FIGS. 3–7 is not involved in FIG. 2, so the control circuit is correspondingly simpler. Instead, brake 64 remains set during the toggle-setting operation in FIG. 2, and then the brake is released when the toggle-erecting power stroke takes place. The two cycles labeled 0°–720° in FIG. 7A would represent one cycle of a control circuit for FIG. 2.

A further modification of the embodiment in FIG. 2 is shown diagrammatically in FIGS. 8–11 at various stages of operation. A prominent difference in construction between the two embodiments is that the two blocks 108 and 108a in FIG. 2 are replaced in FIGS. 8–11 by a single block 208. The remainder of the apparatus is unchanged structurally, so the same numerals are used in FIGS. 8–11 as in FIG. 2 for like parts. FIGS. 8–11 have been simplified by omitting the brake of gear 56 power actuators and control valves in FIG. 2 but they are to be included; and the manner of their sequencing will be readily understood from the following description.

Figure 8:
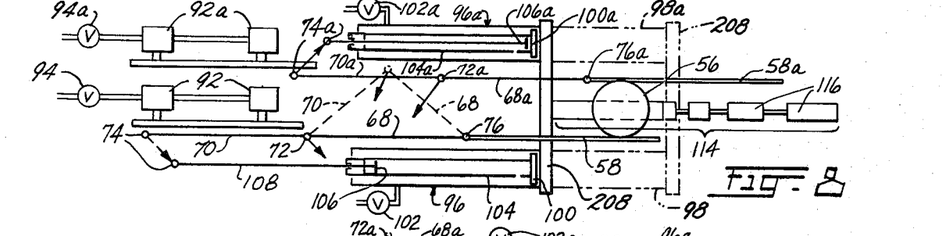
FIGS. 8–11 are diagrammatic lateral elevations of a modification of FIG. 2 in various operating phases.
Figure 9:
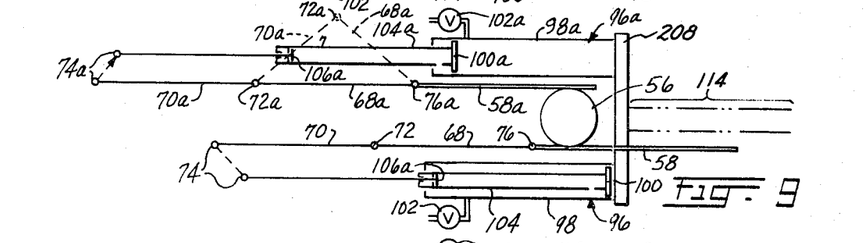

In FIG. 8, the parts are shown in solid lines with gear 56 at its extreme clockwise limit of its rotation and with assembly 114 in its extreme extended state. Gear 56 can be driven to the counterclockwise limit by driving assembly 114 to its collapsed state and thereby moving block 208 and cylinders 98 and 98a to their dotted-line positions, and by pressurizing unit 96 and thereby causing the toggle 68, 70 to buckle as represented in dotted lines. Next, with the input end of the toggle locked in its newly adjusted position, the toggle is caused to execute a power stroke. At the start of this stroke, coupling device 96a has its piston 106a remote from block 208. The parts of coupling device 96 are illustrated in FIG. 8 in their mean-position configuration. This is the same relationship that exists after block 208 has moved to the right, provided part 74 is free to move, and unit 96 is pressurized. At the end of the power stroke of toggle 68, 70 from the dotted-line position in FIG. 8 to the erect condition, the parts appear as shown in FIG. 9. Coupling device 96a is fully extended, not fully contracted as in FIG. 8.

If the mechanism is next to return gear 56 to its clockwise extreme, a reverse rotation of gear 56 compared to the change from FIG. 8 to FIG. 9 can be produced as follows. Block 208 is "adjusted" to stay in the same position as it assumed to reach the configuration of FIG. 9. Coupling device 96a in FIG. 9 is pressurized to draw toggle-end 74a toward the right, and toggle 68a, 70a buckles as represented by dotted lines in FIG. 9. A power stroke is then executed by erecting toggle 68a, 70a while holding its adjustable end 74a locked. The parts then assume the relationship shown in FIG. 10.

Figures 10, 11:
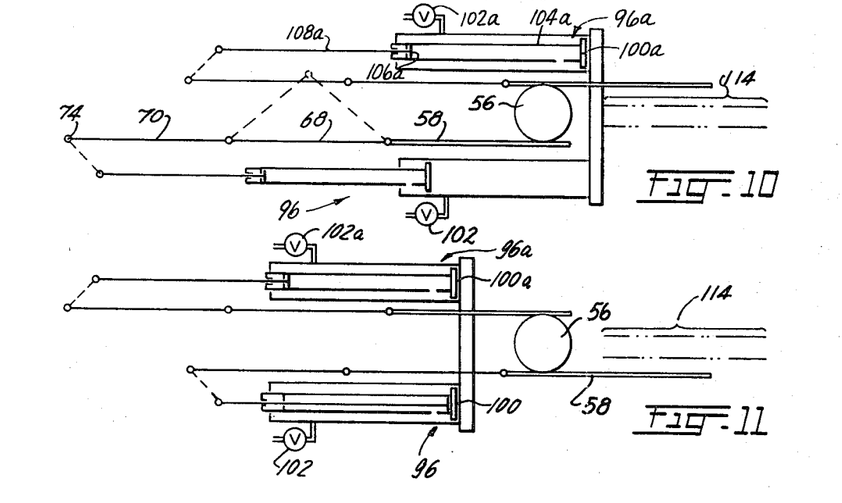

The gear 56 can again be reversed, to return from the configuration of FIG. 10 to that of FIG. 9 by "adjusting" block 208 to retain the position shown in FIGS. 9 and 10, then pressurizing unit 96 to buckle toggle 68, 70 as illustrated by dotted lines in FIG. 10, and then erecting the toggle in a power stroke. Alternatively, gear 56 can be operated to this reversed condition by first shifting block 208 to the left as shown in FIG. 8, pressurizing unit 96 to buckle the toggle 68, 70, and finally erecting toggle 68, 70 so that the parts assume the configuration in FIG. 11.

Figure 12:
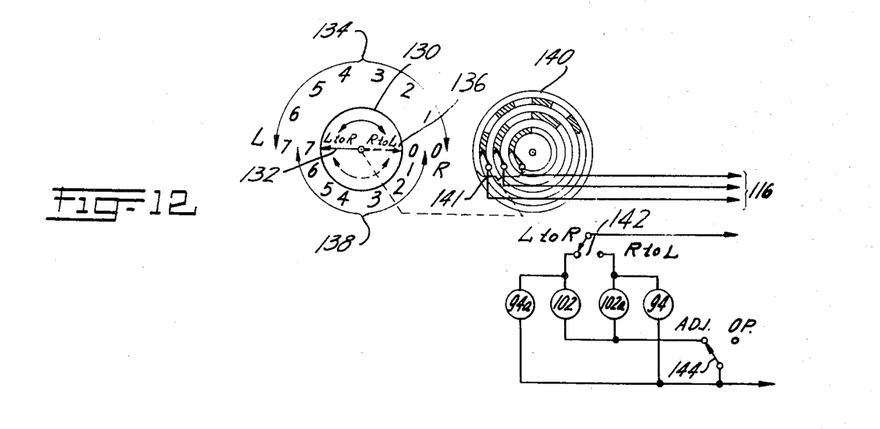
FIG. 12 is a diagram of apparatus for controlling the operating positions of the modification of FIGS. 8–11.

A review of the foregoing suggests that there may be no unique control code for the units 116 of assembly 114 to represent any particular position of gear 56. This is not strictly correct. Depending on the direction of the desired displacement of gear 56, there is a unique code for each position in its range. The code sequence for one direction is the same as that for the opposite direction, but inverted. FIG. 12 shows, diagrammatically, part of the apparatus that may be used for controlling the actuating mechanism of FIGS. 8–11. In FIG. 12 it is assumed, for simplified explanation, that there are eight discrete positions in the whole operating range of gear 56, utilizing three units 116 in assembly 114 of FIGS. 8 to 11. These three units 116 are related to each other to produce unit displacement, double that unit displacement and four times that displacement, respectively. This is purely illustrative, since many more discrete positions may be realized in like manner merely by providing a suitably large number of what may be called "binary-stroke" related units 116.

The control apparatus of FIG. 12 includes a manually operable knob 130 bearing a first pointer 132 (heavy line) that is opposite numeral 7 of the upper scale 134, and another pointer 136 that moves along another scale 138. Knob 130 is coupled to a code wheel 140 having binary coded contact areas subdividing its 180-degree range of rotation into eight equal divisions. Knob 130 coupled to contacts 141 are in their position corresponding to the condition of the apparatus represented in FIG. 8. The control apparatus includes selector switch 142 shown in its left-hand position labeled L to R, and connected for energizing the usual valve-opening solenoids of valves 102 and 94a of FIGS. 8–11. In its right-hand position labeled R to L (the reverse of the position illustrated) switch 142 would energize solenoids to open valves 94 and 102a of FIGS. 8–11.

Operation of the apparatus of FIGS. 8–11 using the manual controls of FIG. 12 is as follows. Switch 144 is set (as shown) to prepare for manual control. With the apparatus in the condition of FIG. 8 and knob 13 in the position shown, it may be desired to execute a left-to-right motion of rack 58 to the "0" position. Knob 130 is rotated so that its pointer 132 reaches the "0" reading of its scale. Contacts 141 move along the contacts of code disc 140 so that the shaded contact areas of the "0" binary code become effective. This correspondingly causes all units 116 to collapse and assembly 114 is adjusted to its minimum length. Switch 142 has been set (as shown) to its left-to-right control position. This pressurizes coupling device 96, and opens brake valve 94 to release input end 74 of the lower toggle. Input end 74 of the toggle moves correspondingly to the right, thereby buckling the lower toggle as shown in dotted lines in FIG. 8. Using appropriate controls (not shown in FIG. 12) valve 94 is then operated for locking the input end 74 of the lower toggle, a brake on gear 56 is released (see brake 62, 64 in FIG. 2) and the power actuator for the lower toggle is operated to erect that toggle. As a result, rack 58 shifts from the position shown to its opposite extreme, shown in FIG. 9.

At the end of the last operation, knob 130 has its pointer 136 opposite the 7 reading. The code wheel contacts are in the position corresponding to the minimum length of assembly 114. In this condition of the apparatus, a right-to-left operation to position 7 can be carried out merely by throwing switch 142 to its opposite setting, labeled R to L. Block 208 remains fixed (FIG. 9) but opening of valve 94a releases the input end 74a of the upper toggle while at the same time operation of valve 102a pressurizes coupling device 96a. This causes unit 96a to assume its mean length, and the upper toggle buckles as represented in dotted lines. In the ensuing powered operation of the apparatus resulting from erection of the upper toggle, the lower rack 58 is driven from its extreme position at the right in FIG. 9 to the left extreme as shown in FIG. 10.

Finally, operation of pointer 132 to the original position represented in FIG. 12 and adjustment of switch 142 to the original position as in FIG. 12, results in elongation of assembly 114 to its maximum length, motion of block 208 to the extreme left-hand position, buckling of the lower toggle as shown in dotted lines in FIG. 10 when coupling device 96 is pressurized, and then the ensuing power stroke of the lower toggle drives rack 58 from left to right, ending in the position shown in FIG. 11.

Comparing FIGS. 8–11 with FIG. 2, it is seen that the dual toggle actuating mechanisms in both forms of construction are capable of the same manner and range of operation. This occurs despite the different use of two reversely moving control blocks 108 in FIG. 2 and a single control block 208 in FIGS. 8–11. This represents but one variation that can be introduced. In each of the examples discussed above, the dual toggles utilize separate hydraulic or pneumatic cylinders for toggle erection, but an obvious variant contemplated (but omitted here in the interest of conciseness) involves the use of a single actuating piston and cylinder for both toggles of a pair.

As a still further detail, the two toggles in FIG. 2 may be mechanically designed for operation by a single erecting actuator, if desired.

The foregoing illustrative embodiments of the invention in its various aspects are subject to a further latitude of variation and varied application by those skilled in the art. Consequently, the invention should be construed broadly in accordance with its full spirit and scope.

What is claimed is:

1. Apparatus for operating a work element, including plural toggles each having a pair of links pivoted together at a knee, said toggles having respective adjustable input ends and having work output ends, means connecting said work output ends to the work element, power actuating means connected to the knees of the toggles for erecting the toggles, and means operative with respect to any selected one of said toggles while buckled for securely adjusting the input end of the selected toggle to a position corresponding to that which should be reached by the work element when said selected toggle is subsequently erected by said power actuating means, said plural toggles including first and second toggles whose work output ends have respective connections to said work element arranged to cause operation thereof in one direction during erection of said first toggle with the input end thereof in an adjusted position and to cause operation thereof in the opposite direction during erection of said second toggle with the input end thereof in an adjusted position.

2. Apparatus for operating a work element as in claim 1, further including means for locking the input end of each said toggle in its adjusted position prior to erection of its toggle.

3. Apparatus for operating a work element as in claim 1, further including means for maintaining control of the work output element while the input end of said selected toggle is being adjusted.

4. Apparatus for operating a work element as in claim 1, further including braking means for holding said work element fixed while the input end of any one of said plural toggles is being adjusted.

5. Apparatus for operating a work element as in claim 1, further including means for maintaining control of the work element while the input end of each selected one of said toggles is being adjusted, and means for locking the adjusted input end of the selected toggle in preparation for the ensuing toggle erecting operation.

6. Apparatus for operating a work element as in claim 1, wherein said first and second toggles are disposed side-by-side, said work element including a shaft, and wherein said means connecting the output ends of said first and second toggles to said work element is arranged to effect rotation of the shaft in one direction or the opposite direction in dependence on which of the toggles is being erected.

7. Apparatus for operating a work element as in claim 1, wherein said work element comprises a rotatable shaft, said first and second toggles being disposed side-by-side and having their work output ends arranged to move in the same direction in executing their power strokes, said means connecting the output ends of said first and second toggles to said work element including a rotary member on said shaft and positive driving means between said work output ends and opposite sides of said rotary member.

8. Apparatus for operating a work element as in claim 1, including a common adjustment means for said input ends of said toggles.

9. Apparatus for operating a work element as in claim 1, wherein said first and second toggles are disposed side-by-side and including a common adjustment means for the input ends of both said toggles.

10. Apparatus for operating a work element as in claim 1, wherein said first and second toggles are disposed side-by-side and including a common adjustment means for the input ends of both said toggles coupled in opposite driving relationship to said input ends of the toggles.

11. Apparatus for operating a work element as in claim 1, wherein said first and second toggles are disposed side-by-side and including a common adjustment means for the input ends of both said toggles coupled in the same driving relationship to said input ends of the toggles.

12. Apparatus for operating a work element as in claim 1, wherein said plural toggles include third and fourth toggles arranged so that said third toggle while being erected can drive the work element in said one direction and the fourth toggle while being erected can drive the work element in said opposite direction, and means for coordinating the operation of said power actuating means and said means for securely adjusting the input ends of the toggles so that, during the time one of said toggles has its input end in a previously adjusted position for effecting operation of said work element to one position, the input end of another toggle is adjusted by said adjusting means to a position corresponding to the ensuing position to which the work element is to be operated from said one position, irrespective of the required direction of operation from said one position to said ensuing position.

13. Apparatus for operating a work element as in claim 12, said apparatus including a locking device for locking the input end of each of said toggles, and said coordinating means including means for maintaining effective the locking device of said one of said four toggles to hold the input end thereof in an adjusted position while maintaining ineffective the locking device of another of said toggles whose input end is being adjusted.

14. Apparatus in accordance with claim 12, wherein said adjusting means includes a common adjusting unit for all said toggles, and respective coupling devices for enforcing cooperation between said common adjusting unit and the input end of a selected one of said toggles.

15. Apparatus in accordance with claim 14, wherein each said coupling device has means constraining it to assume a mean length when the input end of the related toggle is in enforced cooperation with said adjusting unit and wherein each said coupling device has means for accommodating a shift in one direction of one end thereof from its mean-length position and for accommodating a shift in the opposite direction of the other end thereof from its mean-length position, the maximum extent of each said shift being at least the range of adjustment of said adjusting unit.

16. Apparatus for operating a work element as in claim 12, wherein said adjusting means includes a common adjusting unit for said toggles, and respective selectively operable coupling devices for enforcing cooperation between said common adjusting unit and the input end of a selected one of said toggles.

17. Apparatus for operating a work element as in claim 12, further including respective locking means for the input ends of said toggles, and means for maintaining the locking means of one of said toggles effective while the input end of another of said toggles is not locked and is being adjusted.

18. Apparatus for operating a work element as in claim 17, wherein said adjustment means includes a common adjusting unit for all said toggles, and respective selectively operable coupling devices for enforcing cooperation between said common adjusting unit and the input end of a selected one of said toggles.

19. Apparatus for operating a work element as in claim 16, wherein each said coupling device has means constraining it to assume a mean length, and wherein each said coupling device has means for accommodating a shift in one direction of one end thereof from its mean-length position and for accommodating a shift in the opposite direction of the other end thereof from its mean-length position, the maximum extent of each said shift being at least the range of adjustment of said adjusting unit.

20. Apparatus in accordance with claim 1, wherein said means for adjusting the input end of said toggle includes plural combination-code responsive elements.

21. Apparatus for operating a work element in accordance with claim 1, wherein said adjusting means includes a common adjustment means for said input ends of said toggles, said apparatus including means for selectively locking the input end of one of said toggles in position while the latter is being erected by said power actuating means, and coupling means for forcing each of the unlocked input ends of said toggles toward a position conforming to said common adjustment means.

22. Apparatus for operating a work element to successive selected positions, said apparatus having plural toggles each having first and second links pivoted together at a knee, said toggles having respective separately adjustable input ends and having work output ends connected to the work element, power actuating means connected to the knees of the toggles for erecting the toggles, and means for adjusting the input end of one of said toggles while a second of said toggles is being erected under control of its previously adjusted input end.

23. Apparatus for operating a work element to successive selected positions in accordance with claim 22, including locking means for the input ends of each of said toggles, and means for coordinating the adjusting means and the locking means for the input ends of said toggles, said coordinating means controlling the locking means of said one toggle to unlock the input end thereof and causing said adjusting means to adjust said unlocked input end thereof during the time when the input end of said toggle is locked.

24. Apparatus for operating a work element in accordance with claim 22, including a common adjustment unit for said plural toggles and individual coupling devices between said common adjustment unit and said input ends of said toggles, each of said coupling devices having an output end connected to the input end of a respective one of said toggles and an input end connected to said common adjustment unit, and each of said coupling devices including means for accommodating enforced enlargement and contraction thereof from a mean configuration and including means for forcing it toward said mean configuration for establishing a prescribed relationship between the common adjusetment unit and the input end of each of said toggles when the coupling device reaches said mean configuration.

25. Apparatus for actuating a work element directly from each of a series of successive selectively controlled positions to the next position of the series, including plural actuating devices each having an input end that is adjustable independent of the adjustable input end of another of said plural actuating devices, and each of said actuating devices having an output end connected to the work element and each of said actuating devices having a fixed length when fully actuated and having a length prior to actuation that is variable in dependence on the position of the input end thereof and on the position of the work element, power means for separately operating each of said actuating devices, adjustment means for operating each of said input ends to any selected position within a range and means for securing each of said input ends in any selected position established by said adjustment means, and means coordinating said adjusting and securing means and said power means so that, during the time that the input end of one of said actuating devices is secured in a selected position, the input end of another of said actuating devices is unsecured so as to be adjustable by said adjustment means and during the same time said one of said actuating devices is operated by said power means to assume its fixed length, thereby actuating said work element in a power stroke to a position corresponding to the adjusted position of the input end of the actuating device that is operated.

26. Apparatus in accordance with claim 25, wherein said plural actuating devices include at least first and second actuating devices arranged to operate said work element in mutually opposite directions.

27. Apparatus in accordance with claim 25, wherein said plural actuating devices include two actuating devices arranged to operate said work element in one direction and two actuating devices arranged to operate said work element in the opposite direction, said coordinating means being arranged to cause the adjustment means to adjust the input end of one of said actuating devices to a position corresponding to a new position that the work element is to assume while the securing means is effective to maintain arrested a previously adjusted input end of another one of said actuating devices that is thus operable to drive said work element to a position corresponding to the position of said previously adjusted input end, whereby the apparatus is operable to effect sequential selectively controlled operations of said work element from any position to any other position in its range in either direction that may be required while preparing the input end of another of said actuating devices for controlling the ensuing operation.

28. Apparatus for operating a work element as in claim 12, wherein said adjusting means includes a common adjusting unit for said toggles, and respective coupling devices for enforcing cooperation between said common adjusting unit and the input end of a selected one of said toggles, each of said coupling devices having an output end connected to the input end of a respective one of said toggles and an input end connected to said common adjusting unit and each of said coupling devices including means for accommodating enforced enlargement and contraction thereof from a mean configuration and including means for forcing it toward said mean configuration for establishing a prescribed relationship between the common adjusting unit and the input end of each of said toggles when the coupling device reaches said mean configuration.

References Cited

UNITED STATES PATENTS

| 1,042,381 | 10/1912 | Baker | 74—520 |
|---|---|---|---|
| 2,369,362 | 2/1945 | Marzini | 74—520 |
| 3,142,185 | 7/1964 | Knowles | 74—520 |

WESLEY S. RATLIFF, Jr., Primary Examiner

U.S. Cl. X.R.

74—89.15; 214—1